US008240611B2

(12) United States Patent
Vance (10) Patent No.: US 8,240,611 B2
(45) Date of Patent: Aug. 14, 2012

(54) RETRO-GEO SPINNING SATELLITE UTILIZING TIME DELAY INTEGRATION (TDI) FOR GEOSYNCHRONOUS SURVEILLANCE

(75) Inventor: Leonard D. Vance, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 552 days.

(21) Appl. No.: 12/547,567

(22) Filed: Aug. 26, 2009

(65) Prior Publication Data

US 2011/0049302 A1    Mar. 3, 2011

(51) Int. Cl.
*B64G 1/10* (2006.01)
(52) U.S. Cl. ...................... 244/158.4; 701/13
(58) Field of Classification Search .... 244/158.4–158.6, 244/158.8, 164, 171; 701/13, 531; 455/427
See application file for complete search history.

(56) References Cited

U.S. PATENT DOCUMENTS

| | | | | |
|---|---|---|---|---|
| 5,927,652 | A * | 7/1999 | Lansard | 244/158.1 |
| 6,009,376 | A * | 12/1999 | Brodie et al. | 701/480 |
| 6,327,523 | B2 * | 12/2001 | Cellier | 701/13 |
| 6,535,801 | B1 * | 3/2003 | Geier et al. | 701/13 |
| 7,107,007 | B1 * | 9/2006 | Lee et al. | 455/13.1 |
| 7,358,474 | B2 * | 4/2008 | Flynn | 250/206.2 |
| 2004/0049326 | A1 * | 3/2004 | Diggelen et al. | 701/13 |

FOREIGN PATENT DOCUMENTS

EP    1667428    6/2006

OTHER PUBLICATIONS

Jim Shoemaker "Space Situational Awareness and Mission Protection" DARPATech 2005, Aug. 9-11, 2005 pp. 208-211.
Brad Gibson "Time-delay integration CCD read-out technique: image deformation" Mon. Not. R. astr. Soc. (1992) 258, 543-551.
"Characteristics and use of back-thinned TDI-CCD" Hamamatsu, Apr. 2007.

* cited by examiner

*Primary Examiner* — Tien Dinh
*Assistant Examiner* — Keith L Dixon
(74) *Attorney, Agent, or Firm* — Eric A. Gifford (57) ABSTRACT

Geosynchronous surveillance is conducted by injecting one or more observer satellites into a retro sub or super geosynchronous orbit at approximately zero inclination. The observer satellite spins about an approximately North-South axis in an Earth frame of reference to sweep a sensor's FOV around the geobelt. Sensor time delay integration (TDI) is synchronized to the observer satellite's spin-rate and possibly the sum of the spin-rate and the target inertial LOS rate to realize longer integration times. This approach facilitates faster scans of the entire geobelt, more timely updates of the catalog of tracked objects and resolution of small and closely spaced objects. An inexpensive small-aperture body-fixed visible sensor may be used.

24 Claims, 9 Drawing Sheets

| OBJECT # | ECI AZIMUTH | ECI ELEVATION | IRIG TIME | INTENSITY |
|---|---|---|---|---|
| 1 | 37.13415 | 7.155628 | 103:20:31:57.45 | 15342 |
| 2 | 35.93778 | 6.981408 | 103:20:31:57.45 | 531 |
| 3 | 37.13415 | 7.398109 | 103:20:31:57.45 | 9583 |
| 4 | 36.73090 | 7.120638 | 103:20:31:57.45 | 4257 |
| 5 | 36.30780 | 6.989198 | 103:20:31:57.45 | 10098 |
| 6 | 36.85609 | 6.736902 | 103:20:31:57.45 | 167 |

RETRO-GEO SPINNING SATELLITE UTILIZING TIME DELAY INTEGRATION (TDI) FOR GEOSYNCHRONOUS SURVEILLANCE

BACKGROUND OF THE INVENTION

1. Field of the Invention

This invention relates to space situational awareness and more particularly to the detection of objections in geosynchronous orbit about the Earth.

2. Description of the Related Art

An aspect of space situational awareness is the detection, cataloging and tracking of non-stellar objects in geosynchronous orbits. A geosynchronous orbit is an orbit around the equatorial plane (zero inclination plus or minus 15 degrees) of the Earth with the same rotation and same orbital period. A geosynchronous satellite flies over the same points on Earth at the same times each day. A circular orbit at zero inclination is referred to as geostationary. A geostationary satellite remains over the same point on Earth at all times. These satellites orbit at approximately 36,000 km above the Earth with an orbital period of 24 hours. Geosynchronous satellites are considered to be strategic assets by virtue of their enormous communication or intelligence gathering capabilities. Other man made objects such as final booster stages also remain in geosynchronous orbit.

The effectiveness of any geosynchronous surveillance system may be judged on several factors. Can the system collect data to generate a complete catalog of the geobelt in a timely fashion? How quickly and often can the system make a sweep of the entire geobelt to update the catalog? Can the system detect small objects (e.g. cross-section <0.1 m$^2$)? Can the system resolve closely-spaced objects (CSOs) (e.g. <1 km)? Can the system be command to observe a specific portion of the geobelt? Can the system be fielded at relatively low cost?

The current state of the art is a land based optical system of telescopes at three ground sites around the globe known as "GEODSS". The telescopes can only update the catalog at night and must image the objects from 36,000 km away through Earth's atmosphere. This limits the system's capability to detect both small objects and closely spaced objects.

SBSS-LEO injects an observer satellite into a low earth orbit (LEO) at 98 degrees of inclination, close to a polar orbit. The observer satellite orbits the Earth every 90 minutes at 160 to 2,000 km above the surface of the Earth. A telescope is mounted on a two-axis gimbal to scan the geobelt for objects at a range of approximately 36,000 km. A list of objects and their attributes (e.g. time, position and brightness) are transmitted from the observer satellite back to Earth where they are cataloged and tracked. SBSS-LEO uses the 90 minute orbit to perform a sweep of the geobelt and requires at least that long to detect a majority of the objects. SBSS-LEO's ability to resolve small and CSOs is limited by the fixed 36,000 km observation range. SBSS-LEO can be commanded to look in a specific direction but the Earth blocks one-half of the telescope's field-of-view (FOV) at all times. The aperture size required to resolve small objects and CSOs at approximately 36,000 km and the gimbal increase the weight of the satellite, which in turn dramatically effects cost.

GeoST-LEO injects an observer satellite having a body-fixed sensor in a zero inclination equatorial low earth orbit at approximately 160 to 2,000 km above the Earth with the sensor canted at a fixed angle from vertical. The satellite rotates once per 90 minute orbit to hold the angle. The frame transfer rate of the sensor is synchronized to the slow rotation of the satellite to perform time delay integration (TDI) to increase the integration period without smearing caused by motion of objects across the sensor's FOV. TDI of imaging sensors such as charge-coupled devices (CCDs) is widely used in other fields for observation of high speed moving objects. See Gibson et al. "Time-delay integration CCD readout technique: image deformation" Mon. Not. R. astr. Soc. (1992) 258, 541-551; "Characteristics and use of back-thinned TDI-CCD" Hamamatsu, April 2007 and European Patent Application EP 1667428 entitled "Non-CCD imaging device with Tine Delay Integration (TDI) mode" published Jun. 7, 2006, which are hereby incorporated by reference. A list of objects and their attributes (e.g. time, position and brightness) are transmitted from the observer satellite back to Earth where they are cataloged and tracked. GeoST-LEO uses the 90 minute orbit to perform a sweep of the geobelt and, again, requires at least that long to detect substantially all of the objects. GeoST-LEO's ability to resolve small objects and CSOs is also limited by the fixed (approximate) 36,000 km observation range. GeoST-LEO can be commanded to look in a specific direction but again the Earth blocks one-half of the telescope's field-of-regard (FOR) at all times. The aperture size required to resolve small objects and CSOs at 36,000 km increases the weight of the satellite, which in turn dramatically effects cost.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a relatively low-cost solution for geosynchronous surveillance that quickly scans the geobelt, generates the catalog in a timely manner, resolves small and closely spaced objects and may be retasked to observe a specific portion of the geobelt.

Geosynchronous surveillance is conducted by injecting an observer satellite into a retro sub or super geosynchronous orbit at approximately zero inclination with an orbital period of approximately 24 hours. The observer satellite has a visible-band imaging sensor with a field of view (FOV). The sensor suitably includes a detector that detects incident photons continuously and a read out integrated circuit (ROIC) that read outs the images. Time delay integration (TDI) is used to synchronize the transfer of charge to the relative motion of objects across the surface of the detector. A low-cost solution may use a small-aperture body-fixed sensor. A more expensive gimbal mount provides additional observation capability.

The observer satellite spins continuously about an approximately North-South axis in an Earth frame of reference with a spin-rate having a period of no greater than 60 minutes to sweep the sensor's FOV around the geobelt. The range from the observer satellite to the objects in its FOV varies from 80,000 km across the geobelt to a few thousand km as the satellites pass each other. The target inertial LOS rate is negligible at long ranges but increases rapidly as they approach each other and flips as they pass. The sensor's TDI, and more specifically the ROIC's frame transfer rate is synchronized to the satellite's spin-rate and possibly supplemented by the target inertial LOS rate to generate a sequence of sensed images. Synchronization to the LOS rate is optional but may be useful to detect the small and CSOs at the closer ranges. The observer satellite detects any non-stellar objects in each image, assigns attributes including position, time and brightness to each object and transmits a list of the objects and their attributes to Earth.

The observer satellite's spin period is independent of its orbital period, approximately 24 hours, and thus the spin period may be reduced to typically no greater than 30 minutes, preferably 10 minutes and perhaps as little as 1 minute as sensor technology allows. The faster the observer satellite can spin the faster it can update the list and a significant portion of the object catalog. In an embodiment, in which TDI is synched to the satellite's spin-rate plus the target inertial LOS rate the observer satellite may detect and transmit at the completion of the first sweep at least 50% of all non-stellar objects in geosynchronous orbit. Over a 12 hour period at least 75%, of geosynchronous objects less than 0.1 $m^2$ and at least 45% of objects spaced less than 1,000 meters. The observer satellite may be directed to observe a particular region of the geobelt. As the observer satellite is in a near geosynchronous orbit, over 90% of the geobelt is visible at all times. A second observer satellite may be injected approximately 180 degrees out of phase with the initial observer satellite. Working together the pair of observer satellites can detect a much larger fraction of objects in less lime.

These and other features and advantages of the invention will be apparent to those skilled in the art from the following detailed description of preferred embodiments, taken together with the accompanying drawings, in which:

DETAILED DESCRIPTION OF THE INVENTION

The present invention describes a method of conducting geosynchronous surveillance by injecting an observer satellite having a sensor into a retro sub or super geosynchronous orbit at approximately zero inclination. The observer satellite spins about an approximately North-South axis in an Earth frame of reference to sweep the sensor's FOV around the geobelt to detect objects at ranges that vary from a few thousand km to about 80,000 km. Sensor TDI is synchronized to the observer satellite's spin-rate and possibly its target inertial LOS rate to the objects in its FOV to realize longer integration times. The LOS rate is negligible at long range but becomes appreciable at shorter ranges where the small and CSOs are resolved. If sensor TDI is synchronized to only the spin-rate and not the sum of the spin-rate plus the LOS rate the percentage of small objects and CSOs detected may drop significantly. This approach facilitates faster scans of the entire geobelt, more timely updates of the catalog of tracked objects and resolution of small and closely spaced objects. Over 90% of the geobelt is visible at all times. This provides great flexibility to command the observer satellite to observe a particular region of the belt. A small-aperture body-fixed visible sensor may be used, which is light weight and less expensive.

Figure 1A:
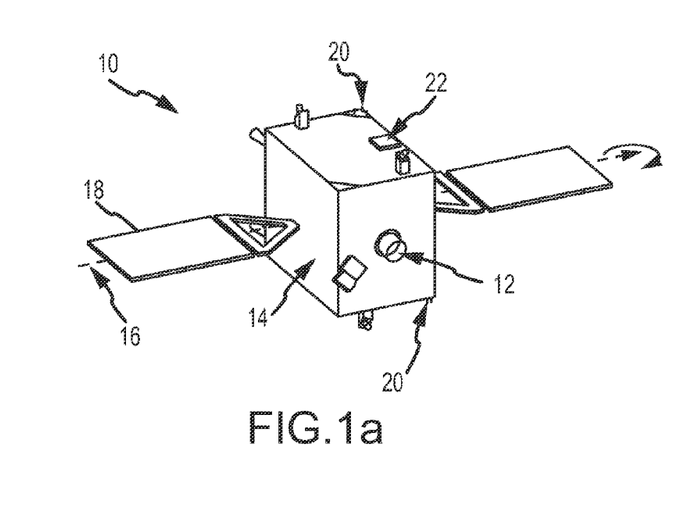
FIGS. 1a and 1b are a perspective view and block diagram of a small aperture body-fixed sensor mounted on a spin-stabilized satellite.
Figure 1B:
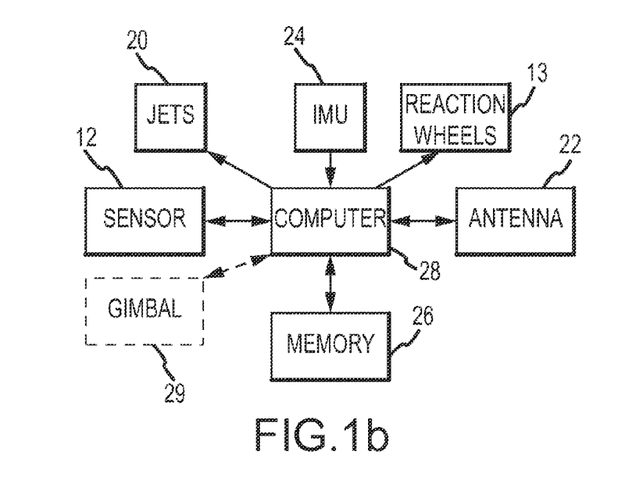

As shown in FIGS. 1a and 1b, a spin-stabilized observer satellite 10 includes a small-aperture (e.g. 20 cm) body-fixed (no gimbals) visible-band sensor 12 having a FOV of approximately 2-3 degrees. A 1024×1024 visible CCD being one example. Other technologies such as CMOS may be used. Small-aperture body-fixed sensors are relatively light weight, hence substantially less expensive than larger-aperture gimbaled telescopes. Three reaction wheels 13 are mounted inside the body 14 to spin the satellite around a spin-axis 16 through solar panels 18 in this embodiment. The sensor is mounted perpendicular to the spin-axis. Altitude control jets 20 provide station-keeping to maintain the desired inclination, approximately zero to the equatorial plane plus or minus two degrees, and the proper orientation, approximately along the North-South axis plus or minus two degrees. A downlink antenna 22 provides communications with Earth, specifically the capability to transmit a list of object and their attributes. An inertial measurement unit (IMU) 24 provides inertial data regarding the satellites location in an Earth frame of reference and the spin-rate and rotation angle of the satellite. A memory 26 stores the sensed images and the object list and may store a LOS rate table for use in any TDI. An on-board computer coordinates communications, controls the sensor, processes sensed images to perform TDI and generate the object list and attributes and manages station-keeping among other functions.

In an alternate embodiment, the small-aperture visible-band sensor 12 could be mounted on a two-axis gimbal 29 (depicted in FIG. 1b as optional) to provide additional capability. In response to a command sent back from Earth, the observer satellite could control the gimbal to reorient the sensor to image a specific portion of the geobelt. For example, a new object may have been detected or an object may have moved in an unexpected manner and it may be desirable to revisit the object in a timely manner. Although the gimbal could be used to sweep the geobelt as the observer satellite spins it is not required.

Figure 2:
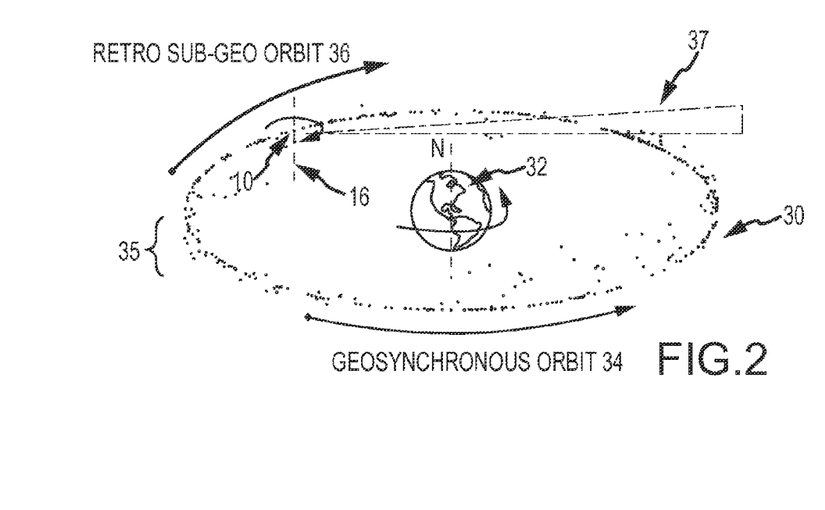
FIGS. 2 and 3 are perspective and plan views respectively of the spin-stabilized satellite inserted in a retro sub-geosynchronous to sweep the sensor's FOV around the geobelt to detect objects.
Figure 3:
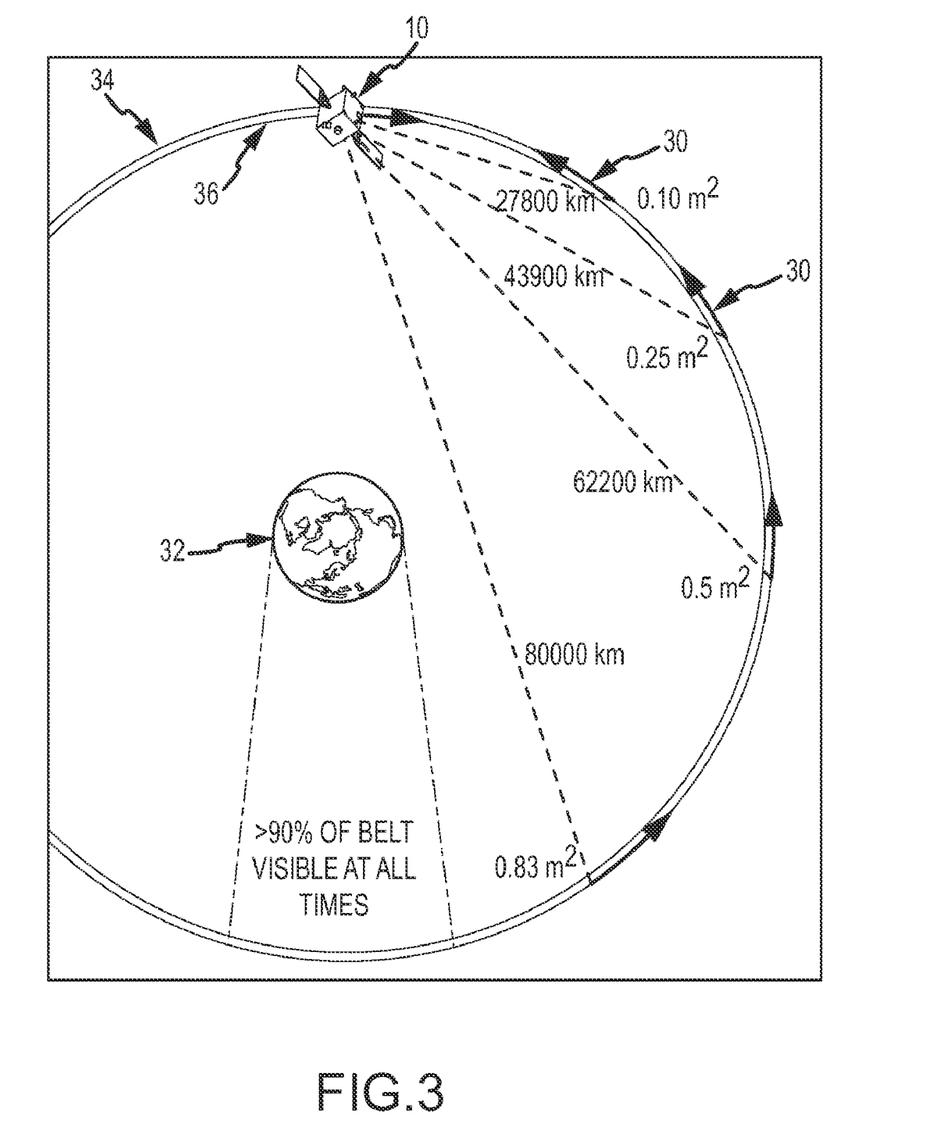

As shown in FIGS. 2 and 3, a large number of satellites 30 (and other man made objects) orbit the Earth 32 in geosynchronous orbits 34. Most of the geosynchronous satellites 30 orbit at approximately zero inclination to the equatorial plane. A few are inclined by up to plus or minus 15 degrees; at a given point in their orbits these satellites will cross through the equatorial plane and lie above or below the equatorial plane by varying amounts. This region and the objects in geosynchronous orbits are referred to as the "geobelt" 35.

Observer satellite 10 orbits the Earth 32 in a retro sub- or super-geosynchronous orbit 36. Most likely the observer satellite 10 will orbit in a retro sub-geo orbit within 700 km of geo, but could be as much as 15,000 km above or below depending on specific system design. The area immediately above geo is typically used for space 'trash' which could interfere or complicate a retro super-geo orbit. A sub-geo orbit also has a period of approximately 24 hours but a little less do to the lower altitude. The observer satellite is preferably injected at zero inclination (plus or minus two degrees) with its spin-axis 16 oriented along the North-South axis (plus or minus two degrees) in an Earth frame of reference. At zero inclination and oriented North-South, the sensor is pointed along the equatorial plane so that its FOV 37 sees a maximum number of geo satellites at any one time. The observer satellite spins around its axis 16 at a spin-rate having a period of no greater than 60 minutes to sweep the sensor's FOV around the geobelt 35. Greater than 90% of the geo bell is visible at all times. The spin period is suitably less than 30 minutes, preferably less than 10 minutes and as low as one minute using current sensor technology (e.g. a 3 degree FOV and 0.5 integration time with current processor speeds) with sufficient SNR to detect non-stellar objects. The observer satellite makes at least 24 complete sweeps per orbit assuming the maximum 60 minute period and up to 1,440 sweeps for a 1 minute period.

Injection of the observer satellite into a "retro" geo orbit instead of a geosynchronous orbit is important. First, the retro orbit allows the sensor to image the 10% of the geobelt that is blocked by the Earth. If the observer satellite rotated with the objects in a geosynchronous orbit the same 10% of the geobelt would always be blocked. Second, as the observer satellite traverses the retro orbit performing multiple sweeps per orbit the range to the same region of the geobelt changes with each sweep. As a result, small objects or CSOs will at some point during the retro orbit be close enough to the observer satellite to be detected. If the observer satellite was placed in a geosynchronous orbit the small objects and CSOs on the other side of the belt would remain undetectable. Third, the retro orbit provides a diversity of the overall sweep of the geobelt that increases the likelihood of detecting objects with each subsequent sweep.

The visible sensor or "focal plane array" electronically transfers images from a photoactive region to a transmission region of the array for pending readout. During image transfer, the local plane array continues to collect photons. Electronic image transfer on the readout chip or "TDI" can be used to counter linear image motion due to object motion across the field of view. The rate of the electronic image transfer commonly referred to as the "frame transfer rate" is synchronized to the spin-rate of the observer satellite and possibly the LOS rate from the observer satellite to objects. Long integration times can lead to dramatically improved sensitivity. This in turn allows resolution of small and closely-spaced objects at long distances. As shown in FIG. 3, the observer satellite can detect objects of 0.1 $m^2$ at 27,800 km, 0.25 $m^2$ at 43,900 km, 0.5 $m^2$ at 62,200 km and 0.83 $m^2$ at 80,000 km from one side of the geobelt to the other. Note, at the shorter ranges required to detect the smallest objects the LOS rate can be appreciable (see FIG. 7b). Synchronizing the TDI to the sum of the spin-rate and LOS rate, particularly at the closer ranges, improves sensor performance and the ability to resolve small objects and CSOs.

Figure 4:
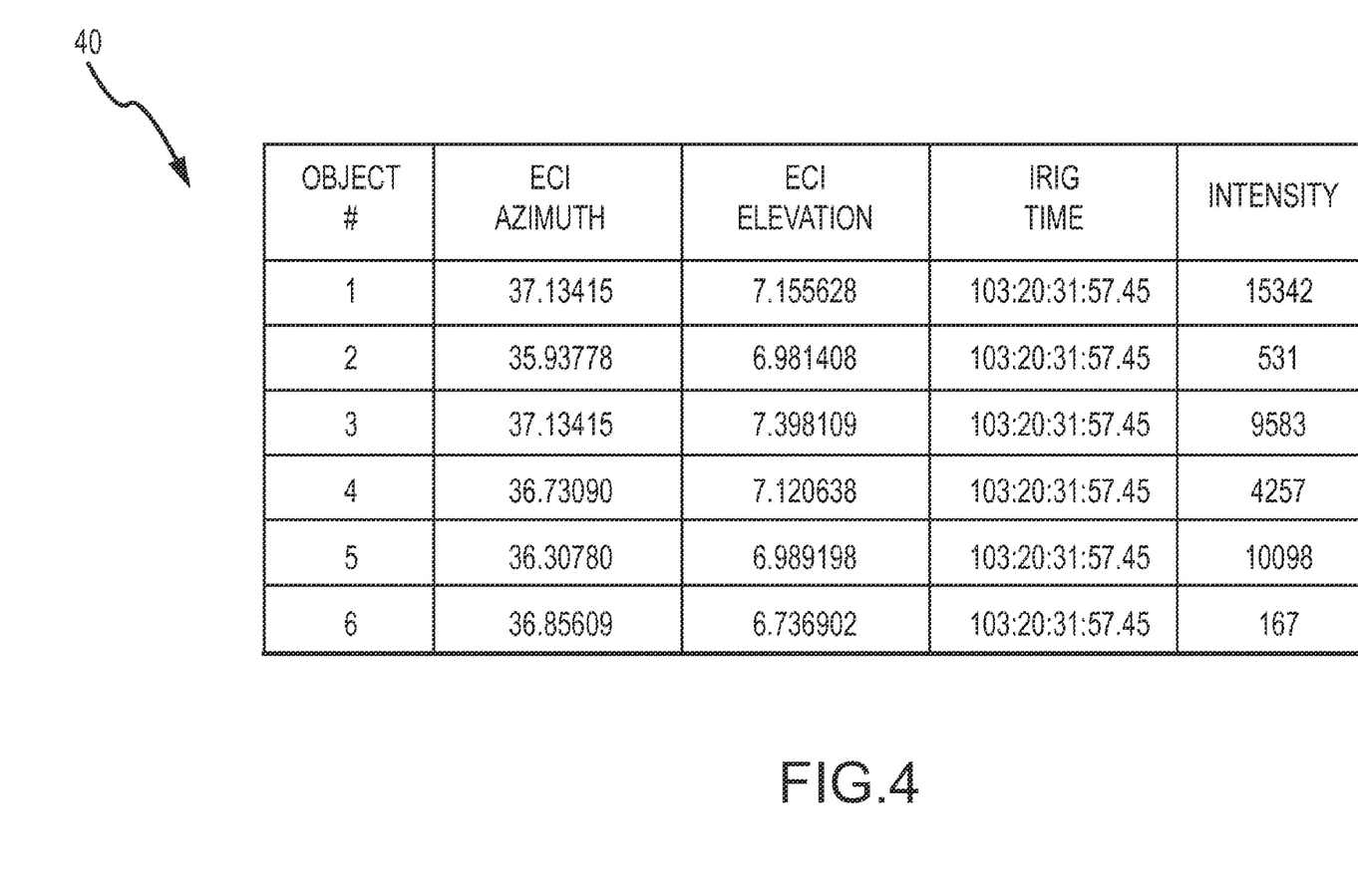
FIG. 4 is an example of a list sent from the satellite back to a ground station of detected objects, position, time and brightness.

The on-board computer compares each sensed image against a known, static star background stored in memory to detect any non-stellar (man made) objects. The computer calculates the object attributes including angular position (azimuth and elevation), the time of the detection and the intensity of the object. As shown in FIG. 4, the observer satellite transmits a list 40 of each object and its attributes for each image to Earth. A land based station processes the list to correlate the detected objects to objects in the existing catalog. The catalog is updated with the new data to track the objects. If a new object is detected it is added to the catalog. If an object is, for example moving in an unexpected manner or too close to a valuable asset a warning may be raised. Other spaced-based assets may be tasked to take a closer look at the identified object. If the observer satellite's sensor is gimbaled, the station may send a command up to the observer satellite to reorient the sensor to take another look at the object. The observer satellite could temporarily suspend its spin to look at the object, with or without the gimbal. In order to monitor new objects and track known objects and to take any further intelligence gathering or remedial actions it is very important that the data is updated often. The capability to identify small and CSOs is also of particular importance.

Figure 5:
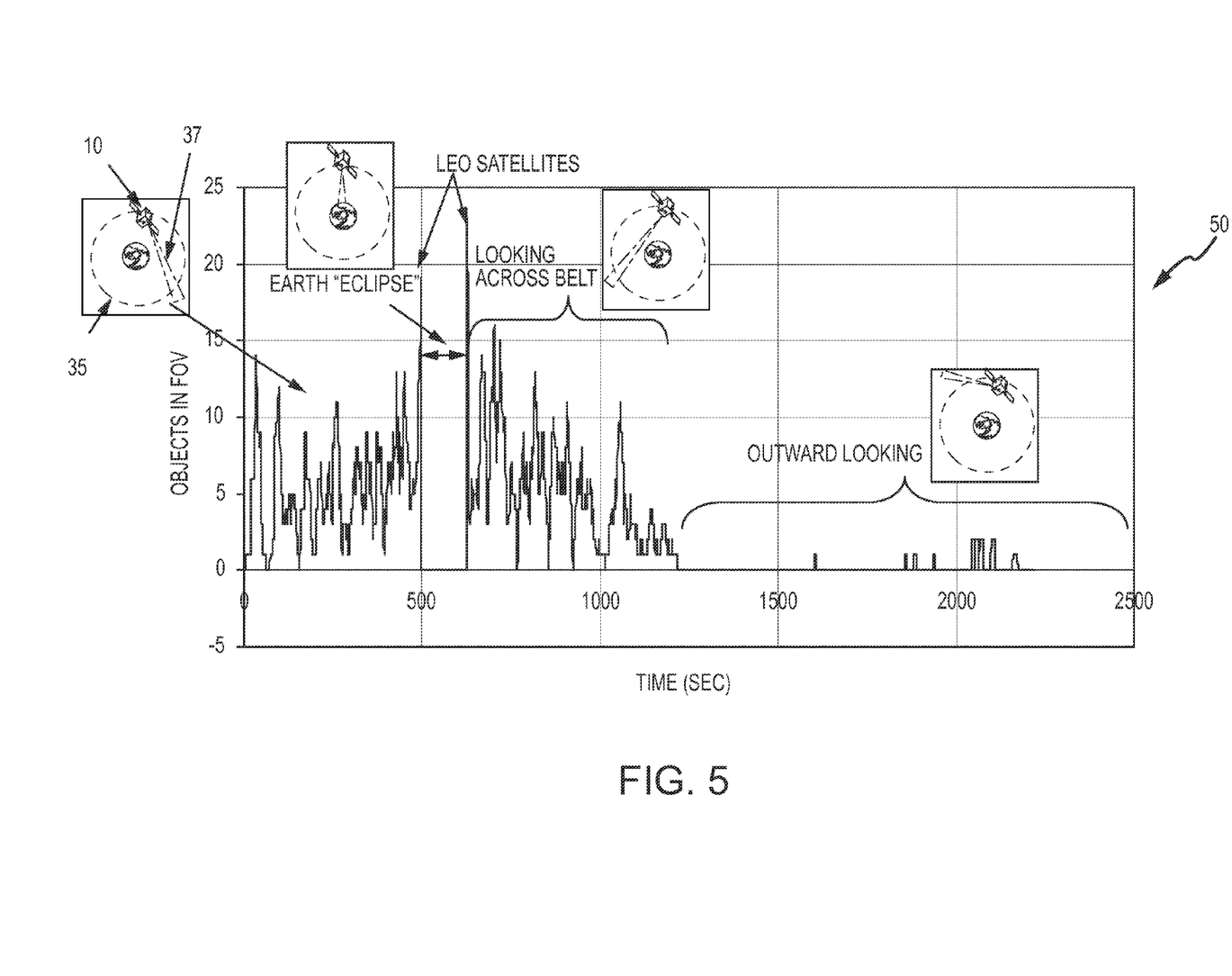
FIG. 5 is a plot of objects in the sensor's FOV versus time for one rotation.

A plot 50 of the number of objects in the sensor's FOV 37 versus time during one exemplary 360 degree sweep of the geobelt 35 is shown in FIG. 5. The observer satellite 10 has a spin-rate corresponding to a 37 minutes (2,220 second) period. From 0-500 seconds the FOV is looking across the belt and detects a large number of objects. From 500 to 630 seconds (<10% of the sweep) the FOV is occluded by the Earth and no objects are detected. Note, immediately on either side of this "eclipse" a large number of objects are detected, these correspond to LEO satellites close to earth-limb. As the FOV emerges from the eclipse, the FOV again detects a large number or objects from approximately 650 seconds to approximately 1250 seconds as it looks across the geobelt. For the remainder of the sweep from approximately 1250 seconds to 2200 seconds the sensor looks outward and almost no objects are in its FOV. Note, in this particular example the solar exclusion occurs while the sensor is outward looking. As the observer satellite traverses its retro sub-geo orbit about the Earth the solar exclusion will sometimes occur when the sensor is looking across the belt causing an exclusion up to 370 seconds. The absolute lengths of the Earth eclipse and Sun exclusion will vary with the spin-rate of the observer satellite but the relative times that the FOV is lost is fixed at 10% and 18%, respectively.

Figure 6:
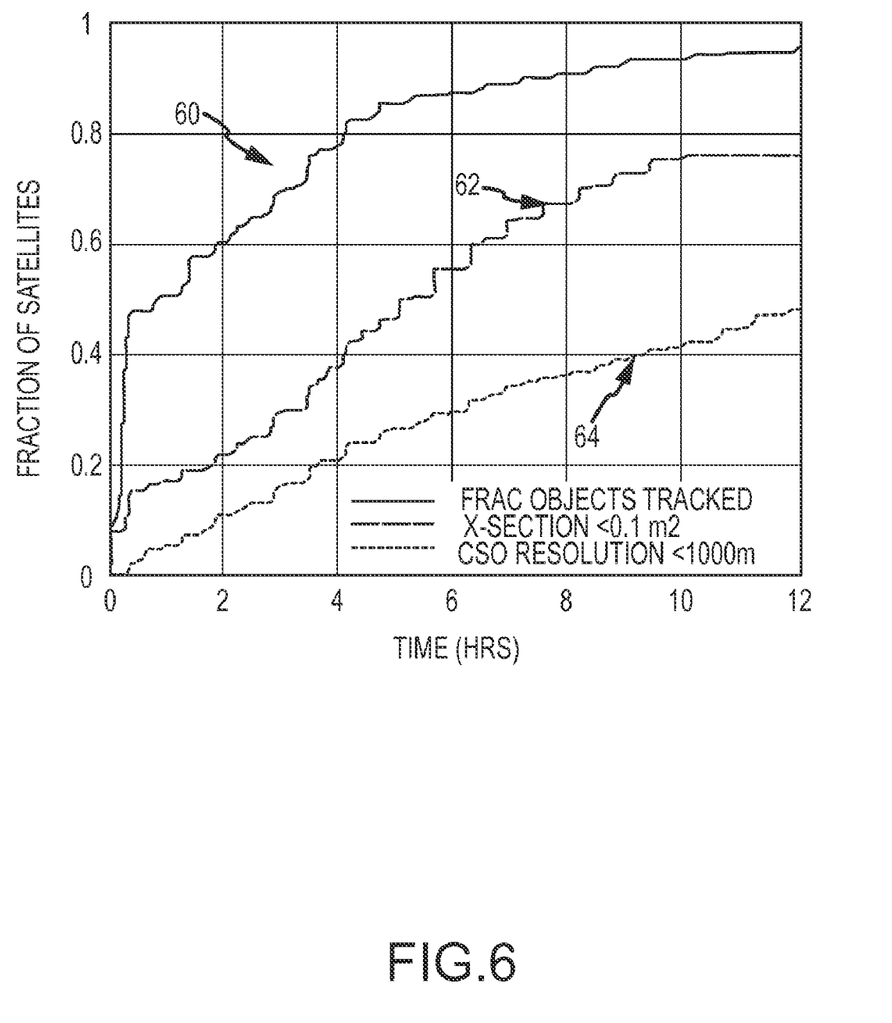
FIG. 6 is a plot or the fraction of objects detected versus time for all of the objects, small objects and closely-spaced objects.

Plots of the fraction of total objects detected 60, of objects having a cross-section <0.1 $m^2$ 62 and of closely-spaced objects (<1,000 μm) 64 against time for a sensor having a 37 minute period are shown in FIG. 6. These plots are representative of the fraction of objects detected whether starting from scratch to build a catalog or to update an established catalog. In one 37 minute cycle, roughly 50% of all objects in the geobelt are detected. In a given sweep, approximately 50% of all objects are either blocked by the Earth, excluded by the Sun or outside the FOV of the sensor (e.g. above or below the equatorial plane). As the observer satellite traverses its retro orbit these objects will emerge from behind the Earth and out of the Sun and will pass through the equatorial plane as the sensor's FOV sweeps the geobelt. Over approximately the next 4 hours the fraction of objects tracked increases steadily picking up objects that were lost due to sun exclusions. The next 7-8 hours the fraction of total objects tracked increases steadily but at a slower rate. This roughly corresponds to picking up objects at relatively large inclinations (outside the sensor's FOV) as they cross through the equatorial plane. At 12 hours approximately 95% of all objects are tracked.

In a given sweep, the percentage of small objects and CSOs detected is small e.g. 10% of small objects and less than 5% of CSOs, because in addition to the Earth eclipse, Sun exclusion and inclination issues, only a relatively small percentage of the geobelt is close enough to resolve these objects. For example, if for a given aperture size the small objects or CSOs must be within 20,000 km to be resolved only 15% of the geobelt is close enough. This range may be extended by using a larger aperture sensor. However, the sensor weight increases roughly with the fourth power of aperture, which can have a dramatic effect oil cost of the sensor itself and more important oil the fuel requirements to launch and orbit the satellite. As the observer satellite traverses its retro orbit different portions of the geobelt will be close enough to detect the small and CSOs. In 12 hours the observer satellite will pass all of the objects in the geobelt. At 12 hours approximately 75% of small objects and 50% of CSOs have been detected. It may take a few days to acquire all of the small and CSOs.

Although only a relatively small fraction of small objects (cross-section <0.1 m$^2$) and CSOs (spacing <1,000 m) are detected in a given sweep with a small-aperture (e.g. approximately 20 cm) this represents a substantial improvement over existing approaches. Both the Earth based telescopes and the LEO observer satellites have a fixed range to the geobelt of approximately 40,000 km. In order to detect small objects and CSOs as we have defined would require much larger aperture sensors. The weight and cost impact makes this prohibitive for LEO satellites. Our retro geo observer satellite has a variable range to the geobelt that spans a few thousand km to 80,000 km. The small-aperture sensor is capable of detecting larger objects over the geobelt and detecting small and CSO within a certain range. This paradigm shift provides flexibility to detect both large and small objects within the weight budget of the observer satellite.

Of potentially equal or greater importance to developing the initial catalog of tracked objects in a timely manner (12 hours), is the capability to update the catalog quickly and often. The retro-geo spinning observer satellite provides this capability. As illustrated the observer satellite can update approximately 50% of the objects in a single sweep of the geobelt. Unlike the known LEO observer satellites, the period of this sweep is not dictated by the orbital period of the observer satellites. The LEO-based systems are constrained to sweep the geobelt once every 90 minutes. The retro-geo spinning observer satellite completes a sweep in no greater than 60 minutes and preferably a much shorter period. As a result, the retro-geo spinning observer satellite can update a much larger fraction of the catalog in a much shorter period.

To detect and track objects in geosynchronous orbit, the objects must appear in the sensed images with a sufficient SNR. In space-based imaging although the background is dark the objects are very small, (e.g. sub-pixel) and the number of incident photons is limited. A way to increase the SNR is to integrate the scene over a longer integration time, e.g. 0.25 to 1 sec. The object may, for example, move 50-100 pixels or more across the FOV during the integration time producing (if uncompensated) a smearing of the object in the image. Time Delay Integration (TDI) is performed to transfer and readout images from the sensor to increase the integration times without smearing the image due to the object moving across the sensor's FOV. The TDI, and more particularly the frame transfer rate of the image in ROIC, is in general synchronized to the sum of the observer satellite's spin-rate plus the target inertial LOS rate of the portion of the geobelt in the FOV.

Figure 7A:
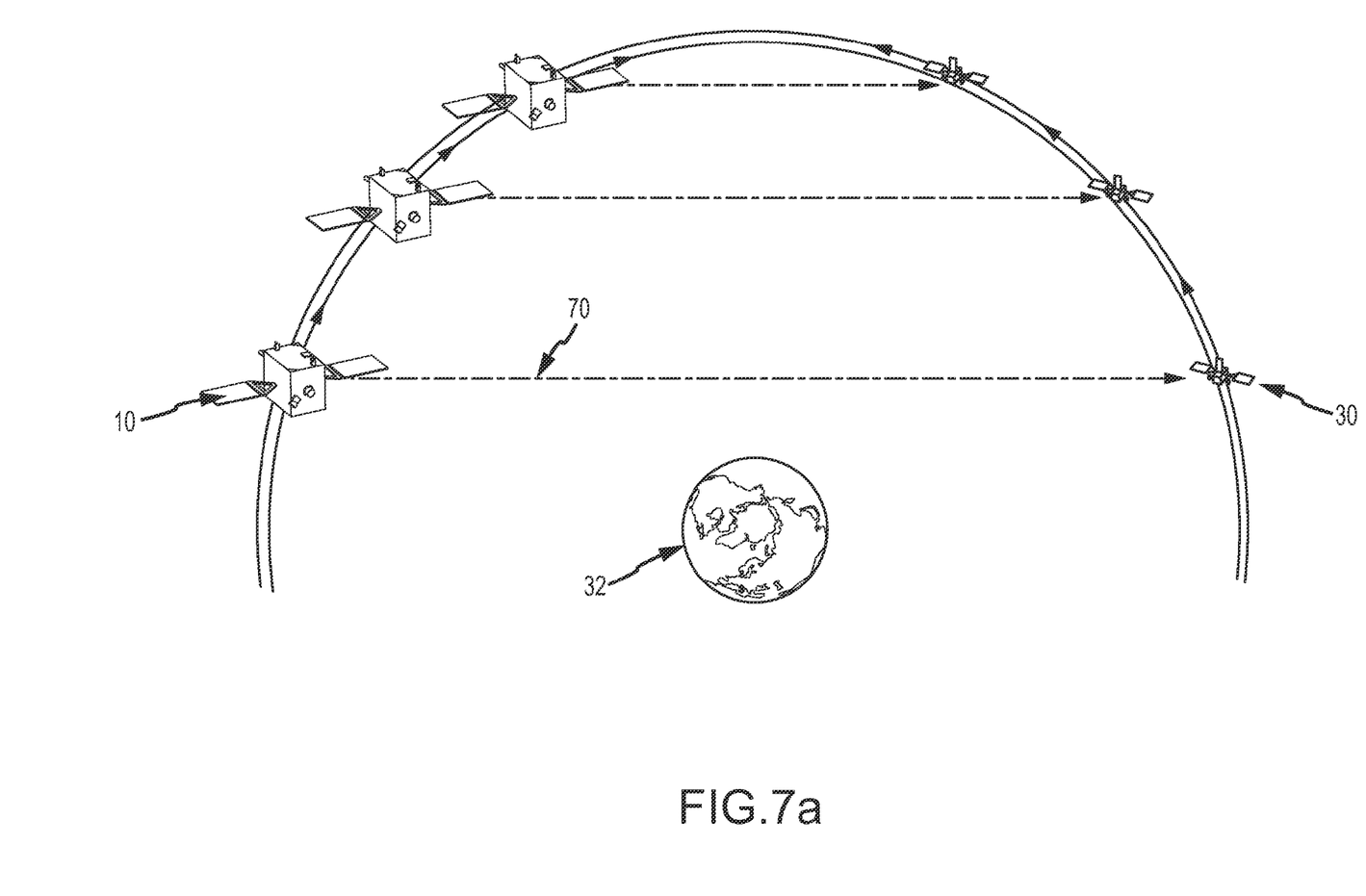
FIGS. 7a and 7b are respectively a diagram illustrating the line-of-sight (LOS) between the retro sub-geosynchronous satellite and an object in geosynchronous orbit and a plot of LOS rates versus range to the object.
Figure 7B:
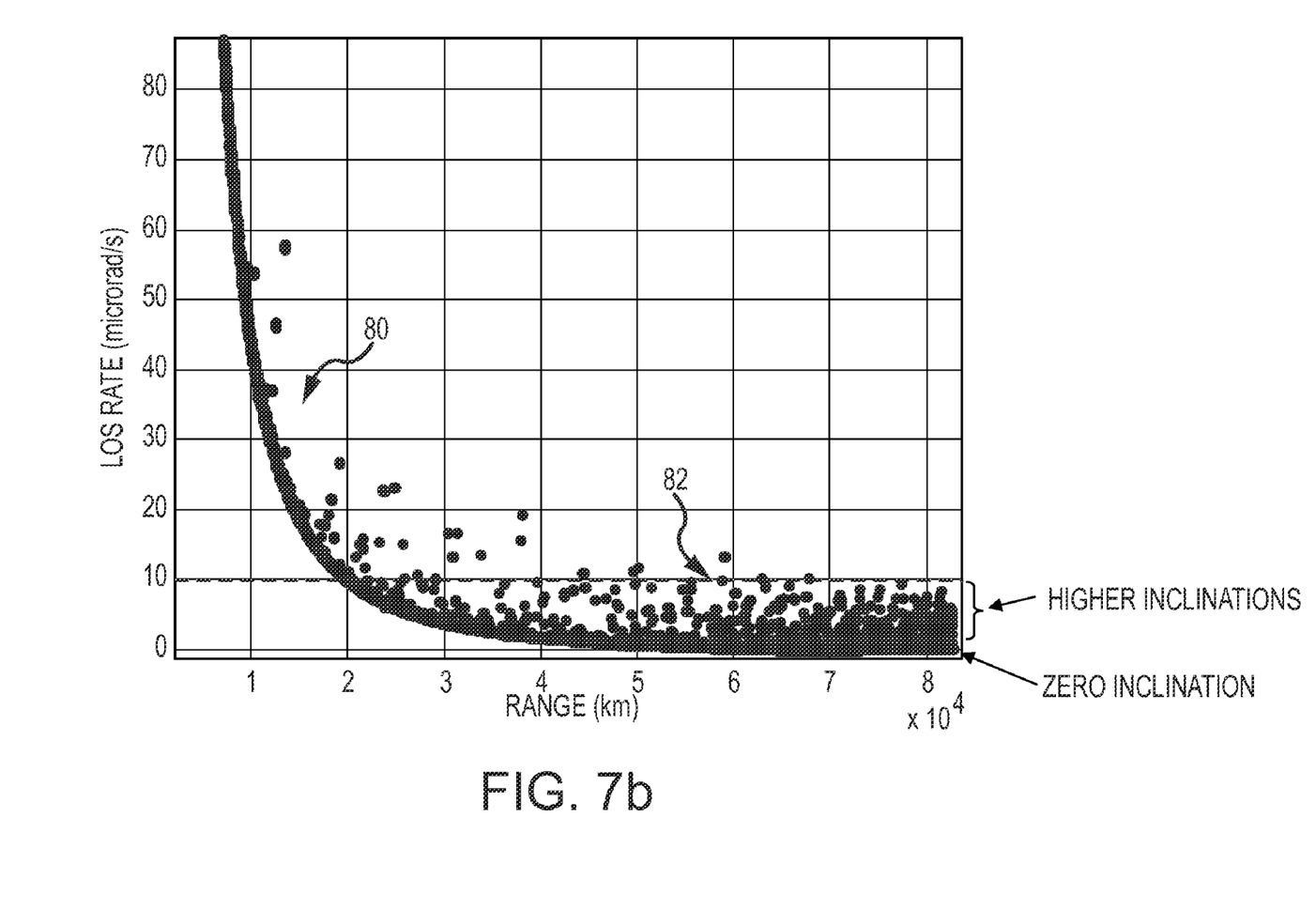

As shown in FIG. 7a the LOS 70 from observer satellite 10 to object 30 remains approximately constant as the travel along the retro sub-geo orbit and geosynchronous orbit, respectively, around Earth 32. As the satellite and object get close to each other (<20,000 km) and eventually pass each other the LOS does change rapidly and rotates near instantaneously a full 180 degrees. The closer the retro sub-geo orbit is to the geo orbit the longer the LOS 70 will remain constant until it flips. As shown in FIG. 7b, the LOS rate 80 is near zero for far field objects at zero inclination. Objects at higher inclinations do exhibit a small LOS rate. For a retro sub-geo orbit 700 km below geo, at approximately 20,000 km the LOS rate 80 starts to increase and increases rapidly as the observer satellite and objects close range and pass each other.

For a given retro sub (or super) geo orbit, the LOS rate 80 can be calculated deterministically to generate a table of LOS rate versus range that can be loaded into memory on the observer satellite. In a first case, LOS rates are stored for the entire range up to 80,000 km. Above the 'knee' at approximately 20,000 km there is some dispersion in the LOS rates caused by the different inclinations of the objects. The majority are at zero inclination but not all. Either the LOS rate for zero inclination or an averaged LOS rate for all LOS rates may be stored. In a second case, the LOS rates beyond a certain range are assumed to be negligible and are set to zero in the table. For example, in this particular embodiment, a ½ pixel smear rate 82, which corresponds to 10 microrad/sec for the particular sensor, is considered to be tolerable. Essentially all of the objects beyond 20,000 km meet the criteria. In a third case, the LOS rate may be assumed to be negligible. In this case, the TDI is only synchronized to the satellite's spin-rate. Most of the objects are detected at ranges at which this assumption reasonable. The greatest impact would be to detecting small objects and CSOs at the closer ranges.

As mentioned previous TDI is widely used for observations of high speed moving objects undetectable by classic sensing. The details of TDI are well known in the relevant art and the details will be omitted. The key point as applied to the retro-geo spinning observer satellite is to synchronize the sensor's TDI to the satellites spin-rate plus possibly the target inertial LOS rate. More specifically the rate at which the accumulated charges in the sensor are moved, often referred to as the "frame transfer rate" is synchronized to the sum of the spin-rate and LOS rate so that the movement of the accumulated charges tracks the movement of the object across the surface of the detector.

Figure 8:
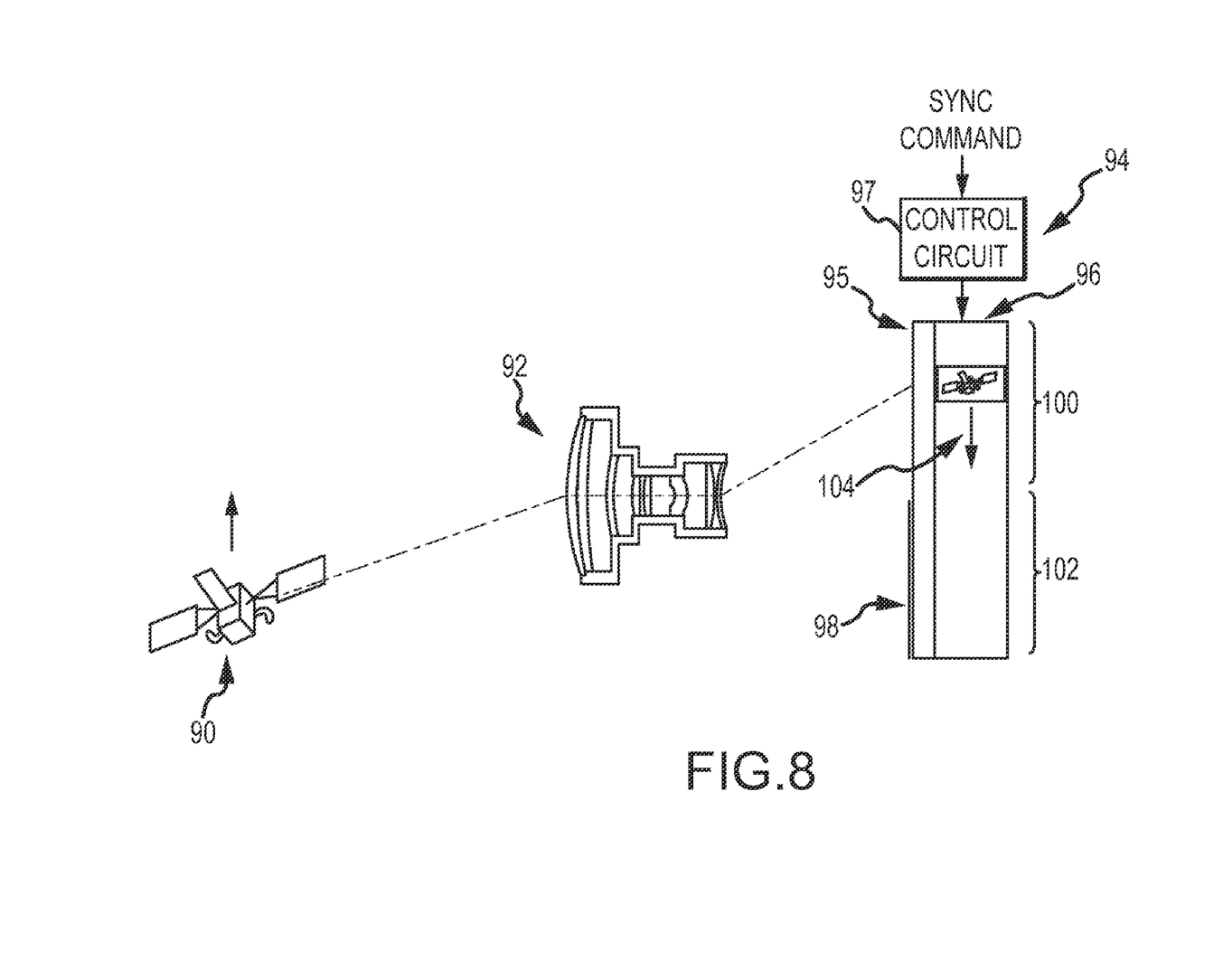
FIG. 8 is a diagram illustrating synchronization of the frame transfer rate on the readout IC to the satellite's spin rate called time delay integration (TDI) to increase integration times for object detection.

As shown in FIG. 8, an object 90 is imaged via an optical system 92 onto the surface of a sensor 94. Sensor 94 may be considered to include a detector 95 that continuously detects photons and a readout integrated circuit 96 that reads Out pixilated images of integrated photons at a discrete rate. Many sensors utilize charge-coupled devices (CCDs) but CMOS chips are also available.

A charge-coupled device (CCD) is an analog shift register that enables the transportation of analog signals (electric charges) through successive stages (capacitors), controlled by a clock signal. In a CCD for capturing images, there is a photoactive region 95 (an epitaxial layer of silicon functioning as the detector), and a transmission region 96 made out of a shift register (the CCD readout circuit, properly speaking). An image of object 90 is projected through optical system 92 onto the capacitor array (the photoactive region), causing each capacitor to accumulate an electric charge proportional to the light intensity at that location. Once the array has been exposed to the image, a control circuit 97 causes each capacitor to transfer its contents to its neighbor (operating as a shift register). The last capacitor in the array dumps its charge into a charge amplifier. Which converts the charge into a voltage. By repeating this process, the controlling circuit converts the entire semiconductor contents of the array to a sequence of voltages, which it samples, digitizes and stores in some form of memory as the 'image'. With a frame transfer CCD, half of the silicon area is covered by an opaque mask 98 (typically black). The image can be quickly transferred from the image area 100 to the opaque area or storage region 102. That image can then be read out slowly from the storage region while a new image is integrating or exposing in the active area.

The computer (See FIG. 1) determines the satellite's spin-rate and LOS rate. The computer can determine the spin-rate either from a measured spin-rate provided by the IMU data or by assuming the spin-rate is equal to a target rate. The computer determines the LOS rate by calculating the position of the satellite in an Earth frame of reference and the instantaneous angle of the sensor from data provided by the IMU. Knowing the position of the observer satellite and the angle of the FOV, the computer calculates the range to the portion of the geobelt within the FOV. The computer than looks up the LOS rate from the table in memory for that range. The computer sums the spin-rate and LOS rate to generate a "sync command" that is provided to control circuit 97. Control circuit 97 synchronizes the "frame transfer rate" 104 to the "sync command" so that the accumulated charges underneath the object move at the same rate as the object across the surface of the photoactive region. As a result, photons from the object are accumulated in the same pixels increasing the SNR of the image without smearing.

Figure 9A:
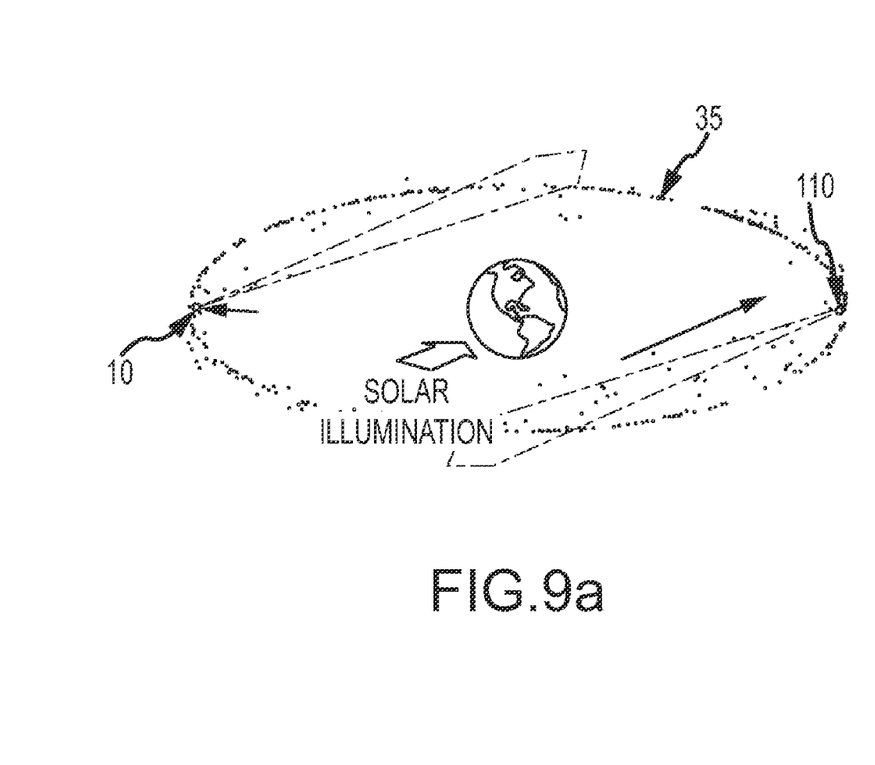
FIGS. 9a and 9b are a perspective view of a pair of spin-stabilized satellites in retro sub-geosynchronous orbits approximately 180 degrees Out of phase and a plot of the fraction of objects detected versus time for the twin satellite system.
Figure 9B:
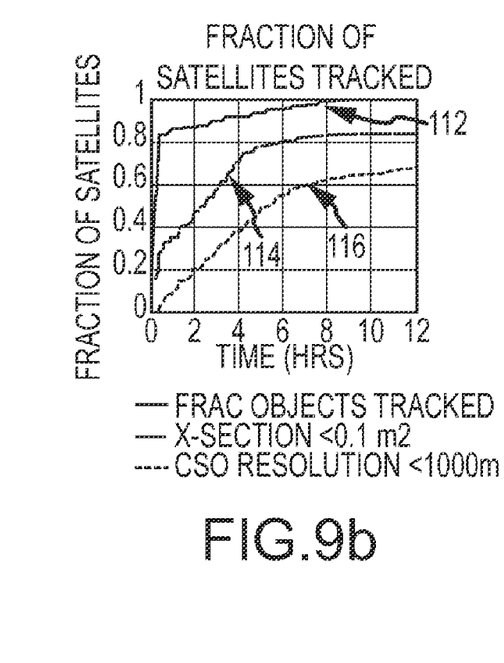

As shown in FIGS. 9a and 9b, a substantial performance improvement may be realized by injecting a second spin-stabilized observer satellite 110 into a retro sub-geo orbit about Earth 32. The second observer satellite 110 is injected out-of-phase with the first observer satellite 10, preferably at approximately 180 degrees to optimize coverage of the geobelt 35. It is convenient but not required that the two observer satellites have the same spin-rate. For purposes of comparison, FIG. 9 plots the fraction of total objects detected 112, small objects detected 114 and CSOs detected 116 for a pair of spin-stabilized observer satellites injected 180 degrees out-of-phase with a spin period of 37 minutes. As shown, at the end of the first 37 minute period over 80% of the total objects are tracked. This principle may be extended to three observer satellites at approximately 120 degree phase, four observer satellites at approximately 90 degree phase and so forth. This not only dramatically increases the percentage of object that can be detected and updated quickly but provides redundancy to the system in case one of the observer satellites was lost.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

I claim:

1. A method for surveillance of objects in geosynchronous orbits within a geobelt, comprising
    injecting an observer satellite into a retro sub or super geosynchronous orbit at approximately zero inclination, said satellite having a visible-band imaging sensor with a field of view (FOV);
    continuously spinning the satellite about an approximately North-South axis in an Earth frame of reference with a spin-rate having a period of no greater than 60 minutes to sweep the sensor's FOV around the geobelt; and
    synchronizing a time delay integration (TDI) of the sensor to the satellite's spin-rate to generate a sequence of sensed images.

2. The method of claim 1, wherein the inclination of the satellite is between plus or minus two degrees of zero inclination.

3. The method of claim 1, wherein the axis of the spinning satellite is between plus or minus two degrees of the North-South axis.

4. The method of claim 1, wherein the satellite is injected into a retro sub geosynchronous orbit no more than 700 km below geosynchronous orbit.

5. The method of claim 1, wherein the imaging sensor is body-fixed to the satellite.

6. The method of claim 1, wherein the imaging sensor is mounted on a gimbal on the satellite.

7. The method of claim 1, wherein the period is no greater than 30 minutes.

8. The method of claim 1, wherein the period is no greater than 10 minutes.

9. The method of claim 1, wherein the sensor comprises a detector with a field of view (FOV) and a read out integrated circuit (ROIC) with a frame transfer rate, said frame transfer rate synchronized to the satellite's spin right to perform the TDI.

10. The method of claim 9, wherein the TDI has an integration time of between 0.25 seconds and 1 second.

11. The method of claim 1, further comprising for each said sensed image;
    detecting non-stellar objects;
    assigning attributes including position, time and brightness to each said object; and
    transmitting a list of the objects and their attributes to Earth.

12. The method of claim 11, wherein within one sweep the satellite detects and transmits a list of at least 50% of all non-stellar objects, at least 15% of non-stellar objects less than 0.1 m$^2$ and at least 5% of objects spaced less than 1,000 meters and within 12 hours the satellite detects and transmits at least 95% of all non-stellar objects, at least 75% of non-stellar objects less than 0.1 m$^2$ and at least 45%, of objects spaced less than 1,000 meters.

13. The method of claim 1, further comprising:
    injecting a second observer satellite into a retro sub or super geosynchronous orbit at approximately zero inclination and out of phase with the retro sub or super geosynchronous orbit of the initial satellite, said second observer satellite having a visible-band imaging sensor with a field of view (FOV);
    continuously spinning the second observer satellite about an approximately North-South axis in an Earth frame of reference with a spin-rate having a period of no greater than 60 minutes to sweep the sensor's FOV around the geobelt; and
    synchronizing a time delay integration (TDI) of the sensor to the second satellite's spin-rate to generate a sequence of sensed images.

14. The method of claim 13, wherein the second satellite's retro geosynchronous orbit is approximately 180 degrees out of phase with that of the initial satellite.

15. The method of claim 1, wherein the sensor comprises CCD or CMOS technology.

16. The method of claim 1, wherein the TDI of the sensor is synchronized to the sum of the satellite's spin-rate and the target inertial line-of-sight (LOS) rate to objects in the FOV.

17. The method of claim 16, further comprising:
    storing a table of target inertial LOS rates versus range to objects in the FOV;
    determining the range to objects in the FOV for each sensed image; and
    using the range to look up the target inertial LOS rate for each sensed image.

18. The method of claim 17, wherein beyond a threshold range the LOS rate is set to zero in the table.

19. A method for surveillance of objects in geosynchronous orbits within a geobelt, comprising injecting an observer satellite into a retro sub-geosynchronous orbit at approximately zero inclination, said satellite having a body-Fixed visible-band frame-transfer imaging sensor comprising a detector with a field of view (FOV) and a read out integrated circuit (ROIC) with a frame transfer rate;

continuously spinning the satellite about an approximately North-South axis in an Earth frame of reference with a spin-rate having a period of no greater than 60 minutes to sweep the sensor's FOV around the geobelt;

determining a target inertial line-of-sight (LOS) rate from the observer satellite to objects in its FOV; and synchronizing the sensor ROIC's frame transfer rate to the sum of the satellite's spin-rate and the LOS rate to perform time delay integration with a period of 0.25 to 1.0 seconds to generate a sequence of sensed images.

20. The method of claim 19, wherein within one sweep the satellite detects and transmits at least 50% of all non-stellar objects.

21. The method of claim 19, wherein the sensor comprises CCD or CMOS technology.

22. A method for surveillance of objects in geosynchronous orbits within a geobelt, comprising injecting a plurality of observer satellites into retro sub or super geosynchronous orbits at approximately zero inclination and out-of-phase with each other, each said satellite having a visible-band imaging sensor with a field of view (FOV);

continuously spinning the satellites about an approximately North-South axis in an Earth frame of reference with a spin-rate having a period of no greater than 60 minutes to sweep the sensors' FOV around the geobelt to simultaneously observe different regions of the geobelt; and synchronizing a time delay integration (TDI) of the sensors to each said satellite's spin-rate to generate a sequence of sensed images.

23. The method of claim 22, wherein the observer satellites are separated by a phase of approximately 360/N where N is the number of observer satellites.

24. The method of claim 22, wherein the TDI is synchronized to the sum of the satellite's spin-rate and the satellite's target inertial line-of-sight (LOS) rate to region of the geobelt.

* * * * *